(12) United States Patent
Dujardin

(10) Patent No.: US 11,992,009 B2
(45) Date of Patent: May 28, 2024

(54) PESTICIDE-CONTAINING SOIL DISINFESTATION MATERIAL WITHOUT USE OF FUMIGANT

(71) Applicant: IMAFLEX INC., Montreal (CA)

(72) Inventor: Ralf Dujardin, Sarasota, FL (US)

(73) Assignee: IMAFLEX INC., Montreal (CA)

( * ) Notice: Subject to any disclaimer, the term of this patent is extended or adjusted under 35 U.S.C. 154(b) by 8 days.

(21) Appl. No.: 17/348,026

(22) Filed: Jun. 15, 2021

(65) Prior Publication Data

US 2022/0039379 A1 Feb. 10, 2022

Related U.S. Application Data

(60) Provisional application No. 63/061,514, filed on Aug. 5, 2020.

(51) Int. Cl.
*A01N 25/34* (2006.01)
*C08J 7/04* (2020.01)

(52) U.S. Cl.
CPC .............. *A01N 25/34* (2013.01); *C08J 7/042* (2013.01)

(58) Field of Classification Search
CPC ... A01N 25/34; C01J 7/042; A01G 13/02758; A01G 13/0262
See application file for complete search history.

(56) References Cited

U.S. PATENT DOCUMENTS

| | | | |
|---|---|---|---|
| 4,522,997 A | 6/1985 | Schmitz et al. | |
| 6,183,532 B1 | 2/2001 | Celli | |
| 8,372,417 B2 | 2/2013 | Dujardin et al. | |
| 8,372,418 B2 | 2/2013 | Dujardin et al. | |
| 8,383,549 B2 | 2/2013 | Parrish et al. | |
| 8,476,369 B2 | 7/2013 | Helling | |
| 2004/0216367 A1* | 11/2004 | Klein | A01M 1/2011 43/114 |
| 2011/0152100 A1* | 6/2011 | Parrish | C08J 7/042 504/214 |
| 2013/0130048 A1 | 5/2013 | Dujardin et al. | |
| 2013/0130911 A1 | 5/2013 | Dujardin et al. | |
| 2013/0181381 A1 | 7/2013 | Dujardin et al. | |
| 2013/0196851 A1 | 8/2013 | Parrish et al. | |
| 2015/0072862 A1 | 3/2015 | Dujardin et al. | |

FOREIGN PATENT DOCUMENTS

| | | |
|---|---|---|
| CA | 2427485 A1 | 5/2002 |
| CA | 2693456 A1 | 1/2009 |
| CA | 2693944 A1 | 1/2009 |
| CA | 2805483 A1 | 1/2012 |
| CA | 2867230 A1 | 10/2013 |
| EP | 0850980 A1 | 7/1998 |
| RU | 2737425 C1 * | 11/2020 |
| WO | WO-2017136987 A1 * | 8/2017 |

OTHER PUBLICATIONS

McCormick, Structural Design of Water-Soluble Copolymers, ACS Symposium Series; American Chemical Society, Washington, DC, 1991.
Mehr et al., Superabsorbent Polymer Materials: A Review, Iran Polymer and Petrochemical Institute, Iran Polymer Journal, 17 (6), 2008, pp. 451-477, Tehran, Iran.
Lejcus et al., Swelling Behavior of Superabsorbent Polymers for Soil Amendment under Different Loads, Polymers, 2018, 10, 271, pp. 1-13.
Dittmar et al., Integrated Pest Management 2019, Vegetable Production Handbook of Florida, Chapter 4, pp. 19-31.
Fennimore et al., Soil Disinfestation with Steam: A Review of Economics, Engineering, and Soil Pest Control in California Strawberry, International Journal of Fruit Science, Jul. 20, 2016, DOI: 10.1080/15538362.2016.1195312.
Stapleton et al., Soil Solarization for Gardens & Landscapes, Pest Notes, Publication 74145, UC IPM, revised May 2019, Oakland, California.
Strauss et al., Anaerobic soil disinfestation: A chemical-independent approach to pre-plant control of plant pathogens, Journal of Integrative Agriculture, 2015, 14 (11), pp. 2309-2318.
Sanogo, Genetic Soil Disinfestation, A Conceptual Framework to Reduce Inoculum Potential of Soilborne Plant Pathogens, Journal of Agriculture and Horticulture Research, Sep. 12, 2019, vol. 2, Issue 2, pp. 1-6.
Yucel et al., "Case Studies and Implications of Chemical and Non-Chemical Soil Disinfection Methods in Turkey", VIII International Symposium on Chemical and Non-Chemical Soil and Substrate Disinfestation, 1044, 2014, pp. 295-300.
International Search Report of PCT/CA2021/050675; ISA/CA; Charles Barabe; dated Sep. 20, 2021.
Molyneux, Book Description, Water-Soluble Synthetic Polymers—vol. I Properties and Behavior, Jan. 10, 2018.
Buchholz et al., Book Description, Modern Superabsorbent Polymer Technology, Wiley, Nov. 1997.
Rivas et al., Review—Water-Soluble and Insoluble Polymers, Nanoparticles, Nanocomposites and Hybrids With Ability to Remove Hazardous Inorganic Pollutants in Water, Jul. 2018, vol. 6, Article 320.
McCormick, Chapter 1—Structural Design of Water-Soluble Copolymers, Water-Soluble Polymers, ACS Symposium Series, American Chemical Society: Washington, DC, 1991.
Schmidt, Polymers-Hydrophilic polymers, Polymers, Apr. 16, 2019, vol. 11, No. 693, p. 3-5.

(Continued)

*Primary Examiner* — Kyle A Purdy
(74) *Attorney, Agent, or Firm* — BCF LLP

(57) ABSTRACT

The present technology generally relates to a pesticide-containing soil disinfestation material comprising: a polymer composite material; a coating material coating at least a portion of the polymer composite material; and non-volatile pesticides. The non-volatile pesticides are released in an amount to provide a concentration of between about 500 grams/hectare and about 5000 grams pesticides per hectare of soil.

26 Claims, 8 Drawing Sheets

(56) References Cited

OTHER PUBLICATIONS

Zohuriaan-Mehr et al., Superabsorbent Polymer Materials A Review, Iranian Polymer Journal, Jun. 2008, 17(6), p. 451-477.
Lejcus et al., Swelling Behaviour of Superabsorbent Polymers for Soil Amendment under Different Loads, Polymers, Mar. 6, 2018, 10, 271, p. 1-13.
Bahram et al., Emerging Concepts in Analysis and Applications of Hydrogels—Chapter 2—An Introduction to Hydrogels and Some Recent Applications, INTECH, p. 9-38.
Ni et al., Research on the crosslinking mechanism of polyacrylamide/resol using molecular simulation and X-ray photoelectron spectroscopy, Polymer Journal, Mar. 10, 2010, 42, p. 357-362.
Dasgupta et al., Microrheology of cross-linked polyacrylamide networks, The American Physical Society, Physical Review E 71, Feb. 24, 2005.
Moll et al., The Structure of Gelatin Crosslinked with Formaldehyde, The Journal of Photographic Science, vol. 22, Sep. 1974, p. 255-261.
Baumbach et al., Abstract of Aluminium and Chromium as Gelatin Hardeners, Journal of the Society of Motion Pictures Engineers, 1946, vol. 47, p. 22-54.
USDA NRCS; Label Review Manual—Chapter 11: Directions for Use; Revised Dec. 2014.
National Pesticide Information Center; Preharvest Interval (PHI); last updated Dec. 19, 2018; retrieved from http://npic.orst.edu/health/phi.html on Oct. 20, 2022.

* cited by examiner

PESTICIDE-CONTAINING SOIL DISINFESTATION MATERIAL WITHOUT USE OF FUMIGANT

CROSS-REFERENCE

The present application claims priority from U.S. Provisional Application Ser. No. 63/061,514, filed on Aug. 5, 2020, the disclosure of which is incorporated by reference herein in its entirety.

FIELD OF TECHNOLOGY

The present technology generally relates to a pesticide-containing soil disinfestation material and method to achieve reliable, predicable, and economical pre-plant soil disinfestation without the use of soil fumigants.

BACKGROUND INFORMATION

Intensive agriculture can be characterized by growing cash crops with high yields on small areas in comparison with arable crops. Investments per $m^2$ are high and thus require high returns. High yields may result into high profits but depend strongly on two factors. On one hand the market price for the product is a factor which can hardly be managed by the grower but on the other hand both quality and quantity of the product are decisive for the growers' income. Continuous cropping of monocultures or different host plants for the same pest or pathogen often leads to heavily infested soils. Fungal soil borne pathogens and parasitic nematodes threaten these crops frequently which forces growers to disinfest the soil thoroughly. Although several methods of physical soil disinfestation with hot gases and liquids, solar heat and/or local oxygen displacement are worldwide applied the most widespread method is chemical soil disinfestation with synthetic (fumigants) or natural plant-derived (bio-fumigants) volatile toxic chemicals, because they provide effective soil disinfestation for intensive field crops and are affordable for growers.

Soil fumigation is a form of soil disinfestation that involves the application of volatile chemical compounds (fumigants) before planting to reduce weeds, soil borne pests and diseases to an acceptable level. Pre-Plant soil fumigation is indispensable in commercial mulched fruit and vegetable production to achieve high marketable yields. Crops grown in soil that require disinfestation before planting with soil fumigants include fruiting vegetables such as tomatoes, pepper and cucurbits, root vegetables such as carrots and potatoes, berry and small fruits such as blueberries and strawberries, citrus fruits such as sweet orange; lemon and grapefruit, asparagus and many more. Hence millions of pounds of fumigants are used to produce these crops every year. Because of their high application rates of several hundred pounds per acre, the most widely used soil fumigants rank in the top 20 pesticides, based on pounds applied per year.

Soil fumigants are unique highly volatile chemicals, enabling them to disperse rapidly through the topsoil profile following application either by direct injection into the soil or via sub-irrigation lines (drip applications). In addition only soil fumigants can maintain a uniform and appropriate lethal concentration throughout the entire topsoil over a couple days or weeks (concentration time product) underneath gas-impermeable plastic tarps, called fumigation films, which minimize fumigant emissions, increase their retention in soil over time and reduce the amount of fumigant needed for effective soil disinfestation.

Non-volatile pesticides cannot be applied uniformly and maintain appropriate lethal dose levels over several days throughout the entire topsoil like fumigants even with multiple spray or drip application. It is known that sprayed or drip applied pesticides rather moves quickly "down" with irrigation water "below" topsoil levels.

To be effective, soil fumigants, as single components or as mixtures, have to be extremely toxic to a wide range of organisms encompassing bacteria, fungi, oomycetes, insects, nematodes, and unwanted plants (weeds) both as seeds and in the vegetative status for effective soil disinfestation.

The practice of soil fumigation, while providing significant benefits as outlined above, also carries significant risks for the health and safety of agricultural workers applying fumigants as well as for people and other organisms in the surrounding environment, because fumigant gases can readily move off site.

Consequently regulation has been implemented to safeguard the general public, applicators and handlers, and the environment from hazardous fumigant emission, for example restricting their general use, increasing respiratory protection requirements and ban of un-tarped fumigant application.

Additional new label requirements include the mandatory use of use of fumigation films to minimize fumigant emission as well as the establishment of restricted-entry buffer zones around fumigant application sites to protect operators and bystanders.

Soil fumigation is a costly practice but compared to alternative physical non-fumigant soil disinfestation methods, such as steam sterilization, solarization, and anaerobic soil disinfestation, faster, more efficient, and more effective.

U.S. Pat. No. 8,372,418 teaches a polymer composite material with biocide functionality, preferably for the use in agriculture inter alia as mulch film, fumigation film, propagation film, comprising a film consisting essentially of a polymer; and at least one coating layer, comprising at least one biocide active ingredient, wherein the biocide active ingredient comprises an organic biocide that can be emitted from the polymer composite material by diffusion and/or osmosis and the method of its production.

U.S. Pat. No. 8,372,417 teaches a polymer composite material with biocide and barrier functionality, in particular for the use in fumigation methods, comprising at least one base polymer compound and at least one barrier functional layer (to retain fumigants), wherein the barrier functional layer comprises at least one binder that is cross-linkable and after cross-linking capable of water absorbing and gel-forming.

In addition U.S. Pat. No. 8,372,417 teaches mulch film, fumigation film, or propagation film comprising at least one coating layer, wherein an organic biocide is incorporated, which is selected from the group consisting of pesticides, herbicides, insecticides, algaecides, fungicides, molluscicides, miticides, rodenticides, germicides, antibiotics, antibacterials, antivirals, antifungals, antiseptics, antiprotozoal, antiparasites, antiseptics and disinfectants.

U.S. Pat. No. 8,383,549 teaches methods of protecting a crop from weed infestation, and reducing fumigant dosage in crop protection, by applying a polymer composite material to soil, a weed, or combinations thereof, wherein said polymer composite material comprises a base polymer compound coated with a first barrier layer comprising a polyacrylate; a second layer comprising gelatin and the herbicide Halosulfuron-methyl biocide; and a third protective layer comprising gelatin and a formaldehyde hardener. It is obvious for a person skilled in the art that the release of an herbicide in concentrations of 20 to 500 grams per hectare will be not be suitable to reduce soil borne pests and diseases, such as harmful insects or nematodes, and phytopathogenic fungi without additional use of fumigants to accomplish effective soil disinfestation.

However, none of these prior-art reference documents suggest or point in the direction of a pesticide-containing soil disinfestation material or teach towards technical direction how to increase the amount of one or combination of organic biocides emitted to the soil beyond concentrations of 20 to 500 grams per hectare and how to select suitable biocides from the group of pesticides, herbicides, insecticides, algaecides, fungicides, molluscicides, miticides, rodenticides, germicides, antibiotics, antibacterials, antivirals, antifungals, antiseptics, antiprotozoal, antiparasites, antiseptics and disinfectants for effective soil disinfestation rather diverges and points in a technical direction away from the present invention by teaching that particularly useful composite material relates to a base polymer wherein the coating materials are preferably superabsorbers, more preferably polyacrylates, gelatin and crosslinked with a hardener, preferably formaldehyde to provide the mobility required for an effective emission of the organic biocide to the target pest or weed by diffusion and/or osmosis and that the coating layer confine the fumigation chemicals and thus reduce the amount needed for effective treatment.

Given the danger, limitations and regulations of chemical fumigation and the economic disadvantages of current non-fumigant methods there is a need to for soil disinfestation that facilitates profitable and sustainable fruit and vegetable production like fumigants but without the use of fumigants.

SUMMARY OF DISCLOSURE

According to various aspects, the present technology relates to an alternative material and method for effective soil disinfestation like soil fumigants, but with significant lower pesticide application rates and health and environmental risk and fewer application steps than soil fumigants, hence lower material and labor costs.

Other aspects and features of the present disclosure will become apparent to those ordinarily skilled in the art upon review of the following description of specific embodiments.

BRIEF DESCRIPTION OF THE DRAWINGS

All features of embodiments which are described in this disclosure are not mutually exclusive and can be combined with one another. For example, elements of one embodiment can be utilized in the other embodiments without further mention. A detailed description of specific embodiments is provided herein below with reference to the accompanying drawings in which:

FIG. 1 is a schematic representation of a cross-section view and a plan view of a pesticide-containing soil disinfestation material according to one embodiment of the present technology, wherein the pesticide-containing soil disinfestation material comprises a polymer composite material and a coating layer, wherein the coating layer comprises a protective coating layer, a pesticide reservoir coating layer and a water equalizing coating layer.

FIG. 2 is a schematic representation of a cross-section view and a plan view of a pesticide-containing soil disinfestation material according to one embodiment of the present technology, wherein the pesticide-containing soil disinfestation material comprises a polymer composite material and a coating layer, wherein the coating layer comprises a protective coating layer and a pesticide reservoir coating layer.

FIG. 3 is a graph showing the Fludioxonil content on coated film of a pesticide-containing soil disinfestation material according to one embodiment of the present technology versus days in the soil.

FIGS. 4A and 4B are graphs showing the release of the indicated pesticide (FIG. 4A: Example 1; FIG. 4B: Example 2) from a pesticide-containing soil disinfestation material according to one embodiment of the present technology.

FIG. 5 is a graph indicating the release of the indicated pesticide (Example 1 and Example 2—See FIGS. 4A and 4B) from a pesticide-containing soil disinfestation material according to one embodiment of the present technology compared to known fumigant materials. * EPA Reg. No. 5481-483; Labeled 62 gal/ac k-pam for nutsedge control: 1 gal. contains 5.8 lbs. active ingredient=403 kg/ha; ** EPA-Reg. #8536-8; Labeled 24.8 gallons Pic-Clor 60 for soil pathogen and nematode control: 1 gal contains 4.7 lbs. 1,3-Dichloropropene=131.36 kg/ha and 7.2 lbs. Chloropicrin=200.74 kg/ha.

FIGS. 6A and 6B are graphs indicating the yields per treatment of a pesticide-containing soil disinfestation material according to one embodiment of the present technology compared to a fumigant material. FIG. 6A: First harvest; FIG. 6B: 3 harvests. Average yield (3 harvests) according USDA 2019 statistics=39,295 kg/ha (35,000 lbs./ac).

DETAILED DISCLOSURE OF EMBODIMENTS

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure in which variations and additions do not depart from the present technology. Hence, the following description is intended to illustrate some particular embodiments of the technology, and not to exhaustively specify all permutations, combinations and variations thereof.

As used herein, the singular form “a,” “an” and “the” include plural referents unless the context clearly dictates otherwise.

The recitation herein of numerical ranges by endpoints is intended to include all numbers subsumed within that range (e.g., a recitation of 1 to 5 includes 1, 1.25, 1.5, 1.75, 2, 2.45, 2.75, 3, 3.80, 4, 4.32, and 5).

The term “about” is used herein explicitly or not. Every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term “about” in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

The expression "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein. The term "or" as used herein should in general be construed non-exclusively. For example, an embodiment of "a composition comprising A or B" would typically present an aspect with a composition comprising both A and B. "Or" should, however, be construed to exclude those aspects presented that cannot be combined without contradiction (e.g., a composition pH that is between 9 and 10 or between 7 and 8).

As used herein, the term "comprise" is used in its non-limiting sense to mean that items following the word are included, but items not specifically mentioned are not excluded.

As used herein, the term "pesticide" refers to substances that are meant to control pests, including weeds. The term pesticide includes all of the following: herbicide, insecticide (which may include insect growth regulators, termiticides, or the like.) nematicide, molluscicide, piscicide, avicide, rodenticide, bactericide, insect repellent, animal repellent, antimicrobial, and fungicide. Most pesticides are intended to serve as plant protection products (also known as crop protection products), which in general, protect plants from weeds, fungi, or insects. In general, a pesticide is a chemical (such as carbamate) or biological agent (such as a virus, bacterium, or fungus) that deters, incapacitates, kills, or otherwise discourages pests. Target pests can include insects, plant pathogens, weeds, mollusks, birds, mammals, fish, nematodes (roundworms), and microbes that destroy property, cause nuisance, or spread disease, or are disease vectors.

In some embodiments, the present technology provides for a pesticide-containing soil disinfestation material that is fumigant-free. The expression "fumigant-free" as used herein refers to the absence of fumigant. In some embodiments, the pesticide-containing soil disinfestation material of the present technology delivers and/or disperses non-volatile pesticides for soil disinfestation through the topsoil profile in the same or in a similar way as fumigants and within the same period as fumigants but without the use of fumigants. As a consequence significant reduced amounts of few pounds of non-volatile pesticides delivered to topsoil are as efficacious as a few hundred pounds of volatile soil fumigants. Fumigants for soil disinfestation are applied before crops are planted either on entire fields or in strips to in-ground or raised planting beds on fields. Liquefied gaseous fumigants and liquid fumigants with low-boiling points are directly injected into the soil using special equipment, or are applied as special fumigant formulations through irrigation systems. Once in the soil, fumigants volatilize, becoming gasses, hence requiring as second step immediately application either expensive fumigation films or water sealing as barrier to prevent them to move from the soil to the air at the application site and off site at concentrations that produce adverse health effects in people from hours to days after their application. Soil fumigants are hazardous chemicals, why they are regulated as Restricted Use Pesticides. This means they can be purchased and applied only by or under the direct supervision of a certified applicator that is training specific to soil fumigants and licensed in by a regulatory authorities.

In some embodiment the application of the composite material of the present technology for soil disinfestation can be applied in one step in the same way as common plastic mulch films and without special training or the need for supervision by a certified applicator.

In some embodiments, the pesticide-containing soil disinfestation material of the present technology eliminates pesticide emissions from soil disinfestation during and after application.

The pesticide-containing soil disinfestation material of the present technology comprises a polymer composite material and a coating material coating at least partially the polymer composite material. The pesticide-containing soil disinfestation material delivers pesticides such as, but not limited to, fungicides, herbicides, and insecticides. In some implementations of these embodiments, the pesticides are non-volatile pesticides such as non-volatile fungicides, non-volatile herbicides and non-volatile insecticides.

In some implementations, the fumigant-free soil disinfestation of the present technology delivers the pesticides at a variable rate into the topsoil so as to provide soil disinfestation.

Unlike many materials currently used in the field of soil disinfestation, the fumigant-free soil disinfestation of the present technology does not comprise superabsorbent polymers and/or hardeners for effecting cross-linking (closing-off). It is known by those skilled in the art that water soluble, but after crosslinking (e.g., curing or hardening) water-insoluble polymer binders, such as gelatin and polyacrylate, range from being mildly water absorbing, typically absorbing 1.3 times of their own weight, to superabsorbent polymer binders (SAP) that can absorb thousands of times their own weight. In addition it is known that the ability of a water-absorbent cross-linked polymer binder depends on the ionic concentration of the aqueous solution. It is known by those skilled in the art that for example a SAP may absorb 300 times its weight of deionized or distilled water, but only approximately 50 times its weight of a 0.9% aqueous saline solution. It is obvious to those skilled in the art that SAP having the capability to absorb at least 25 times their weight of a 0.9% aqueous saline are used in order to emit larger amounts of biocides from the polymer composite material to the soil by diffusion and/or osmosis. Surprisingly and unexpectedly, the non-crosslinked water soluble polymer coating binders of the present disclosure allow for emitting larger amounts of pesticides from the polymer composite material to the soil by diffusion and/or osmosis than the superabsorbent coating binders typically used in the art.

Due to the teaching of the prior-art reference U.S. Pat. No. 8,372,418 for those skilled in the art it is obvious that for a higher mobility, required to emit larger amounts of biocides from the polymer composite material to the soil by diffusion and/or osmosis, superabsorbent coating binders are essential, because of their capability to absorb at least 25 times their weight of a 0.9% aqueous saline. Therefore it is surprising and unexpected for those skilled in the art and quite the contrary that the non-crosslinked water soluble polymer coating binders of the present disclosure allow for emitting larger amounts of biocides from the polymer composite material to the soil by diffusion and/or osmosis than the superabsorbent coating binders.

In some embodiments, the pesticide-containing soil disinfestation material of the present technology can release higher amounts of pesticides per hectare to soil than the currently available disinfestation material. In some implementations of these embodiments, the soil disinfestation material of the present technology releases at least about 500 g, or at least about 1 kg, or at least 2 kg, or at least 5 kg per hectare of soil of pesticides compared to 20 g to 500 g of herbicide released by the polymer composite material with pesticide and barrier functionality disclosed in U.S. Pat. No. 8,372,417, incorporated herein by reference. In some implementations of these embodiments, the soil disinfestation material releases between about 500 g and about 5 kg, or between about 1 kg and about 5 kg, or between about 1.5 kg and about 5 kg per hectare of soil of pesticides (e.g., a mixture of herbicide, fungicide and insecticide).

Polymer Composite Material

In some embodiments, the polymer composite material of the pesticide-containing soil disinfestation material of the present technology comprises at least one polymer. The polymer can be selected from the group of biodegradable polyesters, such as: but not limited to: polybutylene adipate terephthalate, polybutylene succinate, polylactic acid and mixtures thereof, or the group of non-biodegradable polyolefins such as polyethylene such as for example LDPE, LLDPE, HDPE and mixtures thereof, and polypropylene.

In some implementations of these embodiments, the polymer composite material further comprises pigments, additives, fillers, Light stabilizers, UV absorbers, IR absorber and light diffuser, which are well known to the skilled person.

In some embodiments, the polymer composite material is in the form of a flexible film having a thickness of between about 0.075 µm and about 150 µm, or in the form of an inflexible sheet having a thickness of between about 150 µm and about 500 µm. In some embodiments, the polymer composite material is a blown or cast extruded monolayer film or multilayer films comprising three or more layers in either one or two colors In some embodiments the polymer composite material is coated with a thin layer of aluminum. In some instances, the thin layer of aluminum is between about 20 nm and about 50 nm, or between about 25 nm and 40 nm, or about 25 nm.

In some instances, the polymer composite material in the form of a flexible film or an inflexible sheet is treated by low temperature corona discharge plasma, called Corona Treatment, to increases its surface energy to improve wettability and adhesion of the coating material, which is well known to those skilled in the art.

In some embodiments, the polymer composite material for the application as pesticide-containing soil disinfestation material has a thickness ranging between about 10 µm and about 250 µm, or between about 10 µm and about 150 µm, or between about 20 µm and about 120 µm, or between about 20 µm and about 50 µm.

In some embodiments, the thickness of the polymer composite material allows for higher contents of Light stabilizers and UV absorbers 25 nm layer of aluminum and/or an anticorrosion coating with additional amounts of light stabilizers and UV absorbers In some instances, the composite polymer material can withstand at least 12 months of outside exposure to sunlight and weather for the use in annual crop production, so that for example no weeds, pests or fungi can harm the plants after planting till harvest when grown in a field on the polymer composite material as plastic mulch films.

In some instances, the polymer composite material is usable over a period of time that is at least about 36 months.

In some instances, the composite polymer material is biodegradable comprising solely of certified biodegradable (e.g. according to ASTM 6400 or EN 13432 standards) polyesters and gelatin coating binder. In some other instances, the composite polymer material is not biodegradable comprising non-biodegradable polyolefin polymers and polyacrylic and gelatin coating binders.

In some instances, the mechanical stability of the non-biodegradable polymer composite material is kept high so as to be retractable from the field after the crop season for recycling.

Coating Material

In some embodiments, the pesticide-containing soil disinfestation material of the present technology comprises at least one layer of coating material coating the polymer composite material. In some instances, the layer of coating material covers at least partially the surface of the polymer composite material. In some other instances, the layer of coating material covers substantially the entirety of the surface of the polymer composite material.

In some instances, the pesticide-containing soil disinfestation material of the present technology comprises at least two layers of coating material. In some embodiments, the pesticide-containing soil disinfestation material of the present technology comprises at least three layers of coating material. In some embodiments, the pesticide-containing soil disinfestation material of the present technology comprises at most three layers of coating material.

In some embodiments, the coating material is applied in a thin film to the base polymer compounds. In order to achieve the desired characteristics from the thin film, the coating material formulation and the coating layer structure can be tailored in relation to the desired part characteristics, e.g. flexible films or rigid sheets to facilitate and/or time the emission of the pesticide.

In some instances, the thickness of the dry coating layer is less than about 12.5 μm, or less than about 6 μm, or less than about 3.0 μm, or less than about 1.5 μm, or less than about 0.75 μm.

Coating materials can be formulated from a wide variety of chemicals and materials or a combination of different chemicals and applied as single layer or stacked multilayer. Coating materials useful in the present technology are in some instances formulated from one or more of binders, additives, pesticide active ingredients and carrier fluid.

In some embodiments, the coating material comprises gelatin. In some implementations of these embodiments, the gelatin layer is present in the coating layer in an amount ranging from between about 85% and about 100% per weight of the coating layer. In some implementations, depending on the polymer film thickness the total coating layer dry weight translates from between about 0.5% and about 25% per weight of the polymer composite.

In some embodiments, the coating material further comprises a water soluble polymer binder. In some instances, the water soluble polymer binder is sodium polyacrylate. Other examples of water soluble polymer binder that may be enter in the composition of the coating material include, but are not limited to: alginates; cellulose based polymers such as methyl cellulose, hydroxymethyl cellulose, carboxymethyl cellulose, cellulose acetate phthalate, and the like; starch based polymers such as carboxymethyl starch; natural gums, such as gum arabic, locust bean gum, carrageenan gum and xanthan gum; pectin; polymers formed from acid-group containing monomers, such as poly(acrylates) (including poly(acrylic acid), poly(methacrylic acid), and the like), poly(ethers), poly(acrylamides), poly(vinyl alcohol), maleic anhydride copolymers, poly(vinyl sulfonates), hydrolyzed acrylonitrile grafted starch, acrylic acid grafted starch, poly (N-vinyl pyrrolidone), poly(2-hydroxyethylacrylate), poly (2-hydroxyethyl-methacrylate), poly(sodium acrylate-co-acrylic acid), poly(vinyl sulfonic acid), poly(ethylene oxide), block co-polymers of ethylene oxide with polyamides, polyesters, and polyurethanes, and salt forms mixtures and copolymers of the above.

In some embodiments, the coating material is comprised of water soluble polymeric coating binders and is not cross-linked or hardened. In some further embodiments, the coating material does not comprise superabsorbent polymer and hardeners.

In some embodiments, the coating material has a water uptake capacity of less than 5 times its weight in an aqueous solution containing 0.9 weight percent sodium chloride per given coating layer area.

Additives are defined as insoluble pigments or low molecular weight chemicals in coating formulations that allow coatings to perform specific functions but do not contribute to the pesticide function. Additives include but are not limited to emulsifiers, surfactants, dispersants, pigments, defoamer, leveling agents, humectants, and rheology modifiers (viscosity adjusters), and photo-stabilizers and are well known to those skilled in the art. Pigments are typically the colorant portion of a coating material, but can also perform corrosion protection or stability in ultraviolet (UV) light.

The carrier fluid is typically a liquid such as an organic solvent or water. The carrier fluid allows the coating materials to flow and be applied by methods such as spraying, dipping, cascade and/or curtain casting to various substrates including polymer films and sheets. This component may be in the coating formulation before and during application, but evaporates afterwards to allow the solid materials to immobilize and form the coating layer of the resulting polymer composite material.

The carrier fluid might therefore be completely absent, partially present or present in the final, ready-to-use polymer composite material. In a preferred embodiment the carrier fluid is absent or only partially present in the final, ready-to-use polymer composite material. However, the skilled person in the art acknowledges that water or another liquid will be absorbed by the polymer composite material during use and will play an important role for the functionality of the polymer composite material.

In some instances, the organic solvent is, ethanol, acetone, 1,4-dioxane, tetrahydrofuran, N-methyl-2-Pyrrolidone, acetonitrile, dimethylformamide, dimethyl sulfoxide, acetic acid, n-butanol, isopropanol, n-propanol, methanol, formic acid, other solvents known to the skilled person in the art and/or aqueous solutions thereof.

In some embodiments, the coating material of the present technology comprises at least two different pesticides from the group of herbicides, insecticides, and fungicides.

Coating formulations vary widely, with different types and amounts of binders, additives, carrier fluids and pesticides. The differences in coating formulations provide film characteristics specifically set for the part and its end-use. Often, one type of coating material cannot be formulated to provide all of the desired properties. Several layers of different coating materials may be applied to a base polymer to form the coating film.

In some embodiments, at least one layer of coating material is a pesticide reservoir coating layer.

In some embodiments, at least one layer of coating material is a water equalizing coating layer.

In some embodiments, at least one layer of coating material is a protective coating layer. In some instances, the protective coating layer is used to prevent direct contact and exposure of handlers with the pesticide.

The coating materials can be applied to the base polymer form by spraying, dipping, showering with a variety of coating methods, which are divided generally into self-metered and pre-metered coating techniques.

In some embodiments, the application method for the coating material of the present technology is by pre-metered coating techniques such as curtain, slot die, or slide-bead, to achieve distribution of the pesticides and coating thickness in high-precision for improved emission of pesticides in larger amount from the polymer composite material. It is known to those skilled in the art that pre-metered coating methods allow for coating thickness uniformities within 1-2 percent of aim in both the down-web and cross-web directions at high coating speeds independent of the coating solution viscosity by the high degree of accuracy control of the volumetric flow rate of a coating solution per unit width and web speed.

For the use in soil disinfestation the polymer composite material needs to be applied to the soil with the coated side facing the soil with an application process known to those skilled in the art used for plastic mulch film application. This application process begins with preparing the soil in the field. For optimum results the soil must be loose, friable and free of stones, large soil clods, organic residue and other objects that can puncture the plastic mulch. A machine called a plastic layer or a bed shaper is pulled over the field creating a row of plastic mulch covering a planting bed. These beds can be a flatbed, means the surface of the plastic mulch is level with the inter-row soil surface or raised beds where the plastic surface higher than the inter-row soil surface.

It is important for the use of the polymer composite material at first for pre-plant soil disinfestation and thereafter as plastic mulch film for growing crops that it is fit tightly on the soil and that its edges are held firmly in the soil. It is known to those skilled in the art that always 10 to 15 centimeter of a plastic mulch needs to be anchored on each side outside the planting area, so for example a 1.5-meter wide plastic mulch once the edges are buried, leaves about 1.2 to 1.3 meter of useable width to plant in if flat-laid; or about 1 meter of useable width to plant in if laid over a raised bed provided that the height of the bed "shoulders" does not exceed 0.2 to 0.3 meter.

These measures reduce the chance of wind getting under the polymer composite material and causing it to blow off or float up and down, which will reduce the emission of the pesticides from the polymer composite material into the soil as well as will injure plants planted on the polymer composite material when continued to use as plastic mulch film.

It is also known to those skilled in the art that operators have to handle the edges of a plastic mulch film and therefore also of the polymer composite material for the application on the field.

In some embodiments, the coating material is applied on the polymer composite material partially so as to leave at least a portion of the polymer composite material at the edges uncoated to prevent operators' exposure with the pesticide containing coating area and to prevent the unnecessary application of pesticide to soil, which will not be planted, as sustainable practices.

The polymer composite material according to another embodiment of the present technology can be a multilayered coating structure and the pesticides are incorporated into one or more of the coating layers. In some instances, the polymer composite material comprising of a base polymer in the form of a flexible film coated with a first coating layer including a gelatin and sodium polyacrylate; a second coating layer including gelatin and optionally at least two pesticides; and a third coating layer including gelatin.

By the incorporation of the pesticide into coating layers comprising water-soluble coating binders, a control of diffusion and/or osmosis rates is achievable. Different pesticides can be incorporated in the same layer for soil disinfestation. Depending on the water solubility of the selected pesticides and the possible influence of seasonal weather fluctuations on weed germination, fungal and insect growth, a tailored approach to soil disinfestation can be provided.

In an embodiment, the at least one pesticide can be incorporated into the same coating layer with the binders. In some implementations of this embodiment, the coating layer comprises the pesticide and gelatin.

In some implementations, the pesticide is selected from herbicides, insecticides, algaecides, fungicides, nematicides, molluscicides, miticides, and rodenticides.

In some implementations, the pesticide is selected from herbicides, insecticides, nematicides, and fungicides.

In other implementations, the pesticide is selected from but not limited to the chemical family of acetamide and anilide herbicides, thiocarbamate herbicides, chlorphenoxy herbicides, dipyridyl herbicides, dinitrocresolic herbicides, cyclohexyloxim herbicides, phosphonate herbicides, triazole herbicides, urea herbicide derivatives and/or mixtures thereof.

In some other implementations, the pesticides is selected from but not limited to the chemical family of acetamide and anilide fungicides, aliphatic nitrogen fungicides, aromatic fungicides, thiocarbamate fungicides, oxazole fungicides, organophosphorus fungicides, phthalimide fungicides, strobilurin fungicides, urea derivative fungicides, quaternary ammonium antiseptic compounds, quaternary ammonium related antiseptic compounds like chlorhexidine gluconate, polyhexamethylene biguanide hydrochloride, octenidine dihydrochloride and/or mixtures thereof.

In some other implementations, the pesticide is selected from but not limited to the chemical family of cyclodien insecticides, insect growth regulators, carbamate insecticides, neo-nicotinoid insecticides, pyrethroid herbicides, oxadiazine insecticides, organophosphorus insecticides and/or mixtures thereof.

Further examples of herbicides, fungicides and insecticides, including nematicides, useful in the present technology are selected from the annually published code list of the Herbicide Resistance Action Committee (HRAC), the Fungicide Resistance Action Committee (FRAC) and the Insecticide Resistance Action Committee (IRAC).

The current HRAC, FRAC and IRAC code lists contain the most common herbicide, fungicide and insecticide/nematicide substances classified by a letter code according to their modes of action (MoA) as a tool for selecting, mixtures, sequences or rotations of active ingredients, pesticides, with different MoA to prevent or delay the development of herbicide, fungicide and insecticide resistance by treatment of successive weed and or pest generations with compounds from the same MoA.

HRAC, FRAC, and IRAC are specialist technical work groups of the international trade association of agrochemical companies: CropLife International and are recognized by the Food and Agriculture Organization (FAO) and the World Health Organization (WHO) of the United Nations as an advisory body on matters pertaining to herbicide, fungicide and insecticide resistance.

In some embodiments, the fumigant-free soil disinfestation according to the present technology comprises at least two pesticides. In some implementations, one of the at least two pesticides is an herbicide. In some implementations, the herbicide is one or more of acetolactate synthase (ALS) inhibitors such as Halosulfuron and Halosulfuron Methyl, protoporphyrinogen oxidase (PPO) inhibitors such as Sulfentrazone, long-chain fatty acid inhibitors such as Metolachlor, s-Metolachlor, photo-synthesis inhibitors such as Metribuzin and/or lipase synthesis inhibitors such as S-ethyl dipropylthiocarbamate.

In some embodiments, the fumigant-free soil disinfestation according to the present technology comprises at least two pesticides. In some implementations, one of the at least two pesticides is a fungicide. In some implementations, the fungicide is one or more of inhibitors of the nucleic acid synthesis such as Mefenoxam, Metalaxyl, Metalaxyl-M, inhibitors of the signal transduction such as Fludioxonil, inhibitors of the respiration such as Fluopyram, Azoxystrobin, Kresoxim-methyl, Pyraclostrobin and Trifloxystrobin and with multi-site activity such as N-Trichloromethylthio-4-cyclohexen-1,2-dicarboximide, inhibitors of the ergosterol biosynthesis such as Tebuconazole and/or inhibitors of cytoskeleton and motor proteins such as Thiabendazole and Fluopicolide.

In some embodiments, the fumigant-free soil disinfestation according to the present technology comprises at least two pesticides. In some implementations, one of the at least two pesticides is an insecticide. In some implementations, the insecticide is one or more of acetylcholinesterase (ACNE) inhibitors such as Oxamyl and/or fungal inhibitors with unknown mode of action such as Fluensulfone and Fluopyram, which is also a fungicide.

In some embodiments, the pesticides are formulated and/or applied with one or more additional pesticide, compound or synergist. Such combinations may provide certain advantages, such as, without limitation, exhibiting synergistic effects for greater control of insect pests, reducing rates of application of insecticide thereby minimizing any impact to the environment and to worker safety, controlling a broader spectrum of insect pests, safening of crop plants to phytotoxicity, and improving tolerance by non-pest species, such as mammals and fish. Additional compounds include, without limitation, other pesticides, plant growth regulators, fertilizers, soil conditioners, or other agricultural chemicals. Synergists are compounds which increase the action of the pesticide active ingredient, without it being necessary for the synergistic agent added to be active itself.

In another embodiment, the composite material of the present technology comprises at least one pesticide active ingredient that is efficient or repellent against animals such as worms or rodents which can destroy the base polymer of the pesticide-containing soil disinfestation material according to the present technology.

In some embodiments, the pesticide-containing soil disinfestation material of the present technology comprises therefore a polymer composite material, wherein a pesticide active ingredient that is efficient against animal grub is incorporated into the base polymer.

EXAMPLES

The examples below are given so as to illustrate the practice of various embodiments of the present disclosure. They are not intended to limit or define the entire scope of this disclosure. It should be appreciated that the disclosure is not limited to the particular embodiments described and illustrated herein but includes all modifications and variations falling within the scope of the disclosure as defined in the appended embodiments.

Examples—Manufacturing of Fumigant-Free Soil Disinfestation Material

A pesticide-containing soil disinfestation material comprising the following coating layers; i) a water equalizing coating layer; ii) a pesticide reservoir coating layer; and iii) a protective coating layer was prepared. A schematic representation of the pesticide-containing soil disinfestation material prepared is shown in FIG. 1. FIG. 2 represents another embodiment of the pesticide-containing soil disinfestation material comprising the following coating layers; i) a pesticide reservoir coating layer; and ii) a protective coating layer.

All polymer films were Corona treated before coating. All coating solutions prepared used water as carrier fluid and had a total solid content of coating components of 10 percent by weight. The pesticide reservoir and protective coating layers were comprised solely of gelatin as non-crosslinked water soluble polymer coating binders. The water equalizing coating layer was comprised of a mixture of gelatin and sodium polyacrylate as non-crosslinked water soluble polymer coating binders. The pesticides selected from the group of herbicides, fungicides and insecticides were introduced only in the pesticide reservoir coating layer.

Different Fumigant-free soil disinfestation materials (see Table 1) were manufactured by coating a polymer film with aqueous coating solutions with at least the pesticide reservoir coating layer, the protective coating layer and the water equalizing coating layer by using a slot die or curtain coating machine and dried after coating.

TABLE 1

Examples of Polymer Composite Composition of pesticide-containing soil disinfection material according to some embodiments of the present technology.

| | Polymer Composite Composition | | Example 1 | Example 2 | Example 3 | Example 4 | Example 5 |
|---|---|---|---|---|---|---|---|
| Polymer | LDPE Polyethylene film | [µm] | 0 | 0 | 0 | 37.50 | 0 |
| | HDPE Polyethylene film | [µm] | 50 | 50 | 25 | 0 | 0 |
| | Polybutylene adipate terephthalate film | [µm] | 0 | 0 | 0 | 0 | 20 |
| Coating | Gelatin | [g/ha] | 2.74 | 3.06 | 3.06 | 4.36 | 120 |
| | Sodium polyacrylate | [g/ha] | 0.32 | 0 | 0 | 1.44 | 0 |
| | Coated area per film | [%] | 80 | 80 | 80 | 100 | 100 |
| | Number of coating layers | | 3 | 2 | 2 | 3 | 1 |
| | Total Coating thickness | [µm] | 3.2 | 3 | 3.2 | 6.5 | 1.1 |
| | Biocide by group | | | | | | |
| Herbicide | Halosulfuron-Methyl | [g/ha] | 35 | 35 | 35 | 0 | 40 |
| | Sulfentrazone | [g/ha] | 0 | 0 | 202 | 0 | 0 |
| | s-metolachlor | [g/ha] | 0 | 0 | 0 | 800 | 0 |
| | Metribuzin | [g/ha] | 0 | 0 | 0 | 375 | 0 |
| Fungicides | Azoxystrobin | [g/ha] | 96 | 96 | 0 | 0 | 110 |
| | Fludioxonil | [g/ha] | 244 | 244 | 0 | 0 | 0 |
| | Fluopyram | [g/ha] | 0 | 0 | 91 | 0 | 100 |
| | Tebuconazole | [g/ha] | 0 | 0 | 954 | 0 | 0 |
| | Metalaxyl | [g/ha] | 936 | 936 | 0 | 0 | 0 |
| | Mefenoxam | [g/ha] | 1,800 | 1,800 | 0 | 281 | 0 |
| | Trifloxystrobin | [g/ha] | 0 | 0 | 238 | 280 | 0 |
| | Fluopicolide | [g/ha] | 0 | 0 | 0 | 450 | 0 |
| Insecticide | Oxamyl | [g/ha] | 0 | 0 | 0 | 0 | 0 |
| | Fluopyram | [g/ha] | 0 | 0 | 0 | 0 | 250 |
| | Fluensulfone | [g/ha] | 0 | 0 | 0 | 2,807 | 0 |
| | Total Biocide | [g/ha] | 3,111 | 3,111 | 1,520 | 4,993 | 500 |

All fumigant-free soil disinfestation materials manufactured released at least on selective herbicide to control annual local and invasive perennial weeds such as nutsedge, at least one fungicide to control *Pythium, Rhizoctonia, Phytophthora, Aphanomyces* and *Fusarium oxysporum* soil borne pathogens and at least one insecticide to control major plant-parasitic nematode groups such as *Meloidogyne, Pratylenchus*, Mesocriconema xenoplax, *Belonolaimus* and *Tylenchorhynchus* nematodes, in soil disinfestation before the planting of crop groups including fruiting vegetables such as tomatoes, pepper and cucurbits, root vegetables such as carrots and potatoes, berry and small fruits such as blueberries and strawberries, citrus fruits such as sweet oranges, lemons and grapefruits, and asparagus. Crop grouping regulations are developed by the International Crop Grouping Consulting Committee (ICGCC) and are used to establish pesticide tolerances for a group of crops that are botanically or taxonomically related. Representatives of a crop group or subgroup are those crops whose residue data can be used to establish a tolerance on the entire crop group or subgroup.

Examples—Lab Soil Pesticide Release Testing 200 g of dry soil is placed in rectangular thin layer chromatography chamber of 27×7×26 cm with lid and 20 g water is added to the soil. A 58 cm$^2$ of a polymer composite material sample is placed on the humid soil and weight down by a glass plate with a contact pressure of –3.5 g/cm$^2$ to simulate similar contact conditions with the soil as in the field after application of the polymer composite material like a plastic mulch film. An air conditioner on a timer blew cool air on the tank for 8 hours each night to simulate night conditions.

After the set contact time with the soil the film sample is removed, moisture is dabbed off, loose dirt is brushed off and then the sample is dried at 60 C in an oven for 10 min. After drying the sample is cut into 100 small squares (each about 7.5 by 7.5 mm), placed in a small glass flask with 5 gram of Methanol and a magnetic stir bar. The flask is capped, stirred for 4 hours and the methanolic solution is then analyzed by HPLC. The difference between the initial and remaining amount of pesticide is released to the soil during the set time. The lowest concentration of analyte that can be determined with an acceptable repeatability and trueness by the method is 0.025 mg/m$^2$=0.25 g/ha Limit of quantitation (LoQ). As shown in Table 2, the release rates of some of the fumigant-free soil disinfestation materials prepared.

TABLE 2

Retention/Release rates of fumigant-free soil disinfestation materials

| Pesticide content of fumigant-free soil disinfestation materials after set time on Soil [g/ha] | 0 days | 7 days | 14 days | 21 days |
|---|---|---|---|---|
| Example 1 | | | | |
| Halosulfuron-methyl | 35 | 0 | 0 | 0 |
| Azoxystrobin | 96 | 12 | 0 | 0 |
| Fludioxonil | 244 | 57 | 23 | 0 |
| Metalaxyl | 936 | 12 | 1 | 0 |
| Oxamyl | 1800 | 0 | 0 | 0 |

TABLE 2-continued

Retention/Release rates of fumigant-free soil disinfestation materials

| Pesticide content of fumigant-free soil disinfestation materials after set time on Soil [g/ha] | 0 days | 7 days | 14 days | 21 days |
|---|---|---|---|---|
| Example 2 | | | | |
| Halosulfuron-methyl | 35 | 0 | 0 | 0 |
| Azoxystrobin | 96 | 9 | 0 | 0 |
| Fludioxonil | 244 | 53 | 17 | 0 |
| Metalaxyl | 936 | 15 | 0 | 0 |
| Oxamyl | 1800 | 0 | 0 | 0 |
| Example 3 | | | | |
| Halosulfuron-methyl | 35 | 0 | 0 | 0 |
| Sulfentrazone | 202 | 15 | 0 | 0 |
| Fluopyram | 91 | 0 | 0 | 0 |
| Tebuconazole | 954 | 125 | 45 | 8 |
| Trifloxystrobin | 238 | 65 | 35 | 3 |
| Example 4 | | | | |
| s-metolachlor | 800 | 5 | 0 | 0 |
| Metribuzin | 375 | 0 | 0 | 0 |
| Mefenoxam | 281 | 19 | 0 | 0 |
| Fluopicolide | 450 | 60 | 30 | 15 |
| Fluensulfone | 2807 | 0 | 0 | 0 |
| Example 5 | | | | |
| Halosulfuron-methyl | 40 | 0 | 0 | 0 |
| Azoxystrobin | 10 | 0 | 0 | 0 |
| Fluopyram (fungicide + nematicide) | 350 | 14 | 0 | 0 |

FIG. 3 shows the results of a lab release test for Fludioxonil, which is hardly water soluble at 7, 14 and 21 days. The data presented in FIG. 3 confirms complete release of Fludioxonil before planting.

Example—Soil Disinfestation Field Trial Test Procedure

Randomized Complete Block Design at independent field testing station in Hillsborough County, Florida, USA with Spodosols soils, 7 replications, 4 treatments.

Soil was inoculated before disinfestation to establish equal heavy nutsedge, fungal pathogens and nematodes pressure across all treatments. Soil disinfestation with black fumigant-free soil disinfection materials films from Example 1 and 2 in comparison to best grower fumigation standard in Florida with Pic-Clor60® and K-pam® fumigants covered with white (to reduce seasonal plant heat stress) total impermeable fumigation film (TIF)) and to non-disinfested soil covered with white mulched film as untreated reference.

Random 3" by 3 inch (58 cm$^2$) samples taken from plastic composite black films on soil after 2 and 3 weeks to determine amount of pesticide released in soil before planting by extraction with Methanol and HPLC analysis.

Tomato (Charger variety) was transplanted 3 weeks after soil disinfestation application to comply with labeled planting interval of fumigants, grown to maturity and harvested three times. All treatments receive identical horticultural caretaking i.e. fertilization, irrigation, and post-plant insecticidal sprays.

INCORPORATION BY REFERENCE

Figure 1:
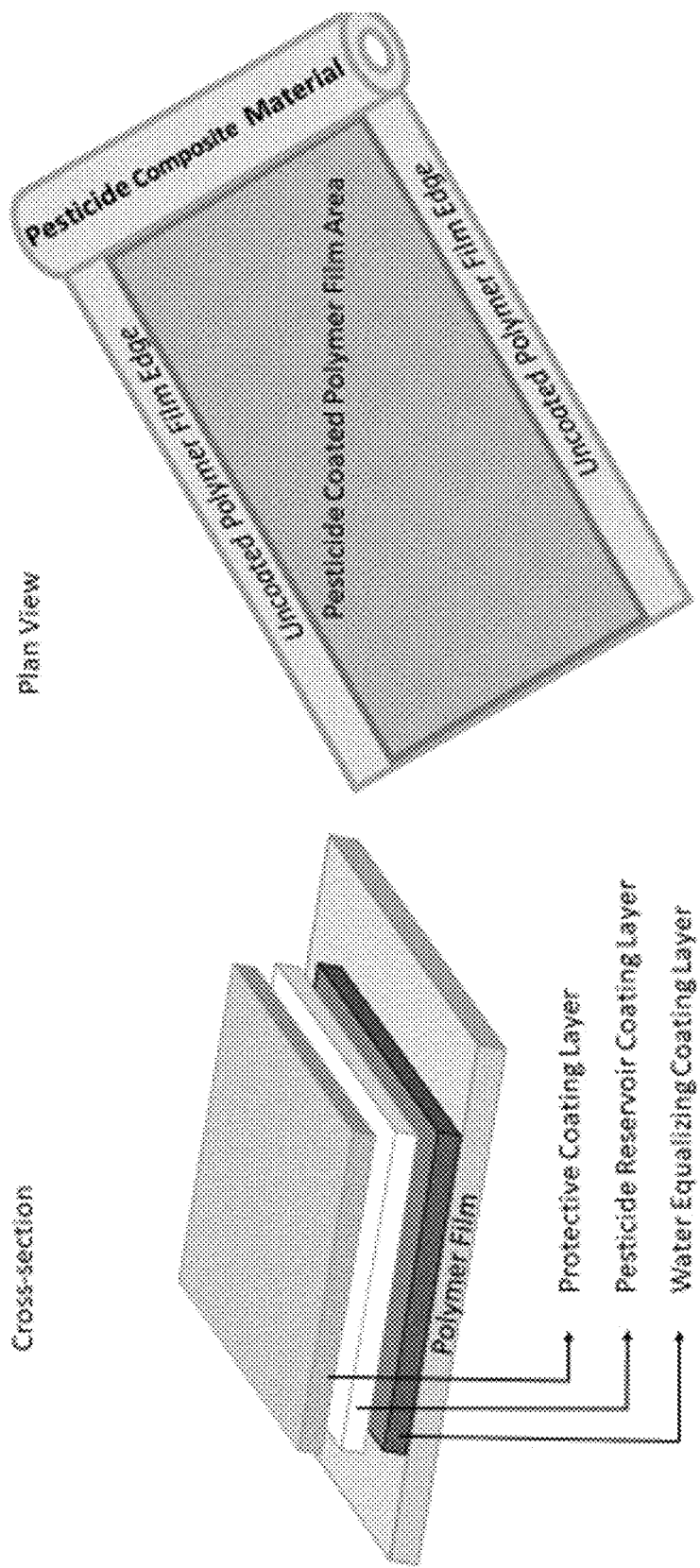
Figure 2:
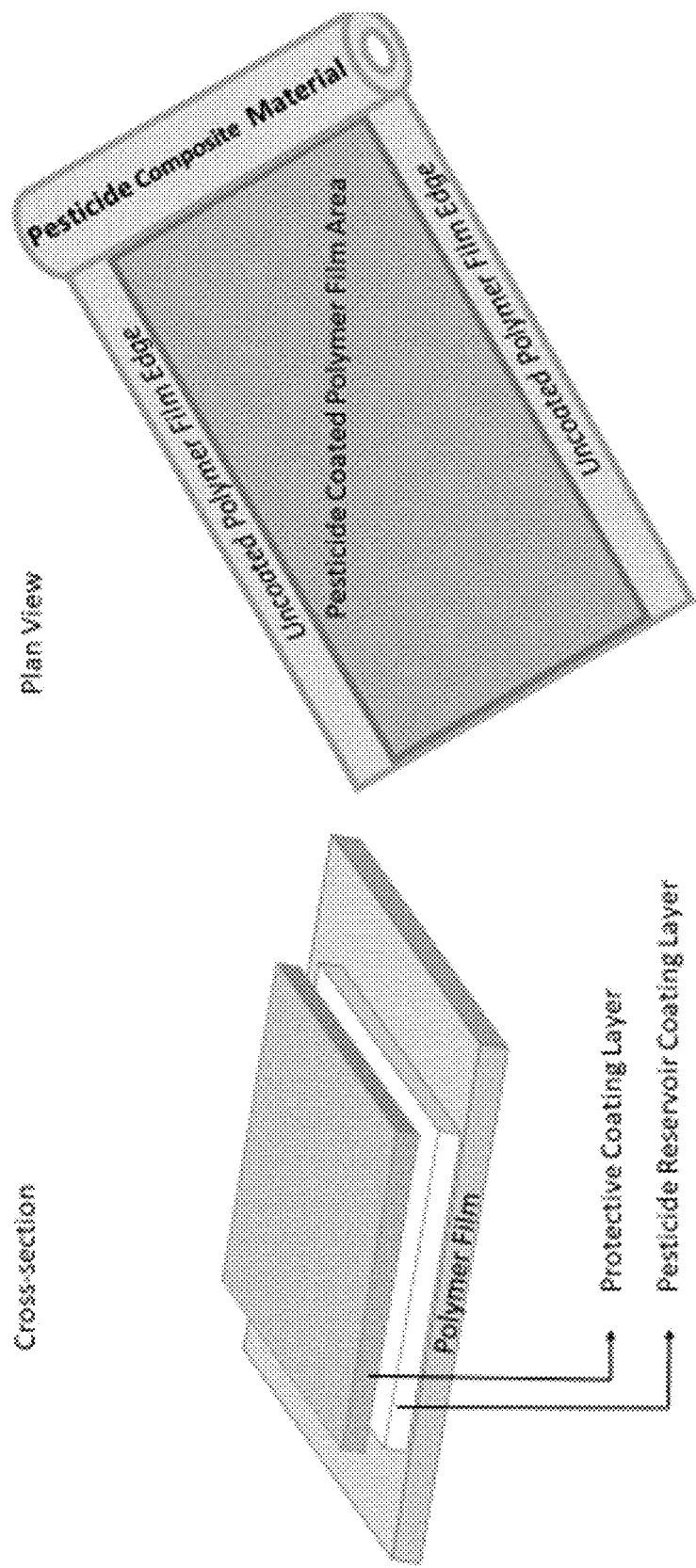
Figure 3:
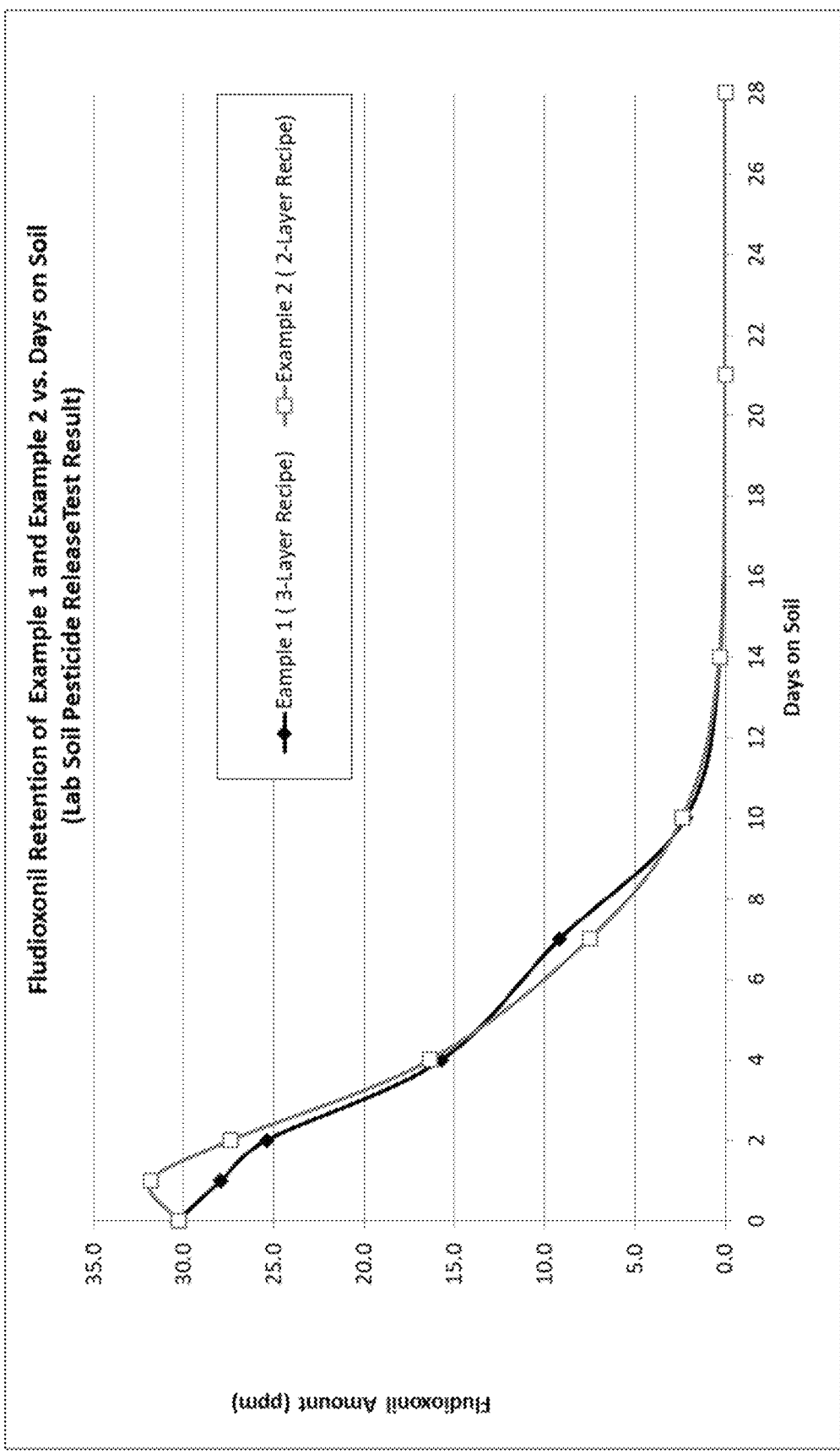
Figure 4A:
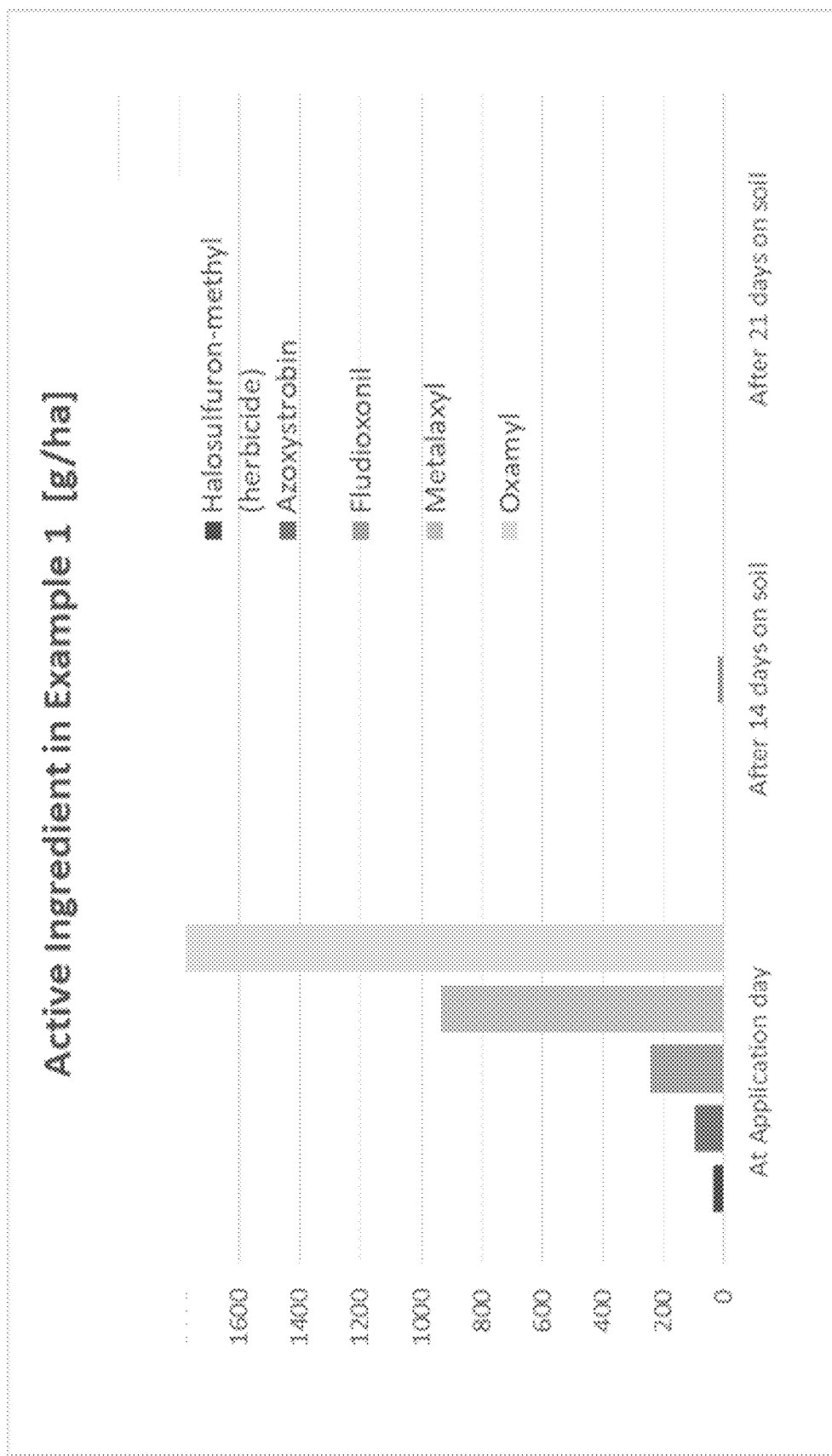
FIGS. 4A and 4B show the release/retention of the active ingredients from/in the fumigant-free soil disinfection materials into soil over application time.
Figure 4B:
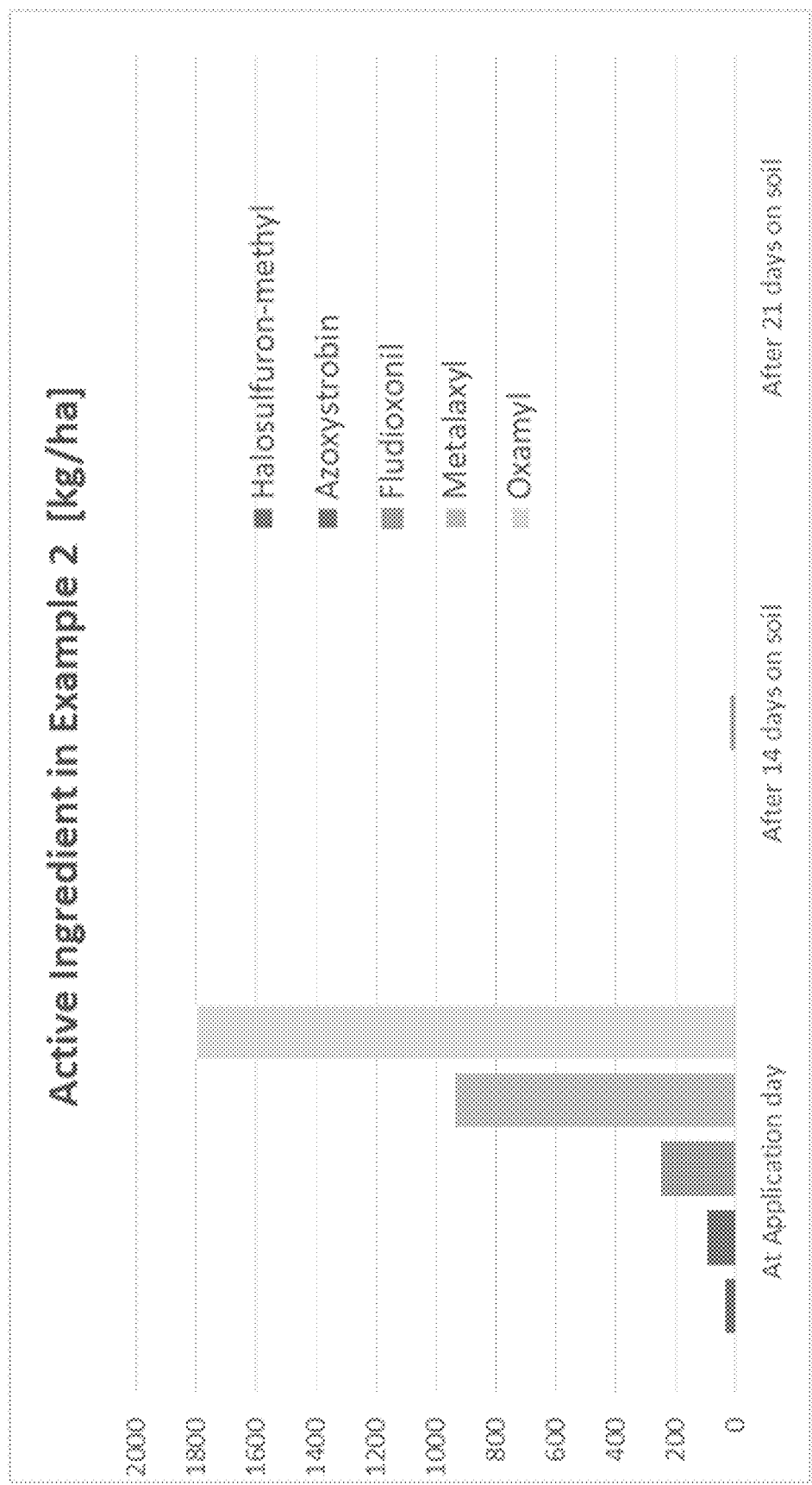
Figure 5:
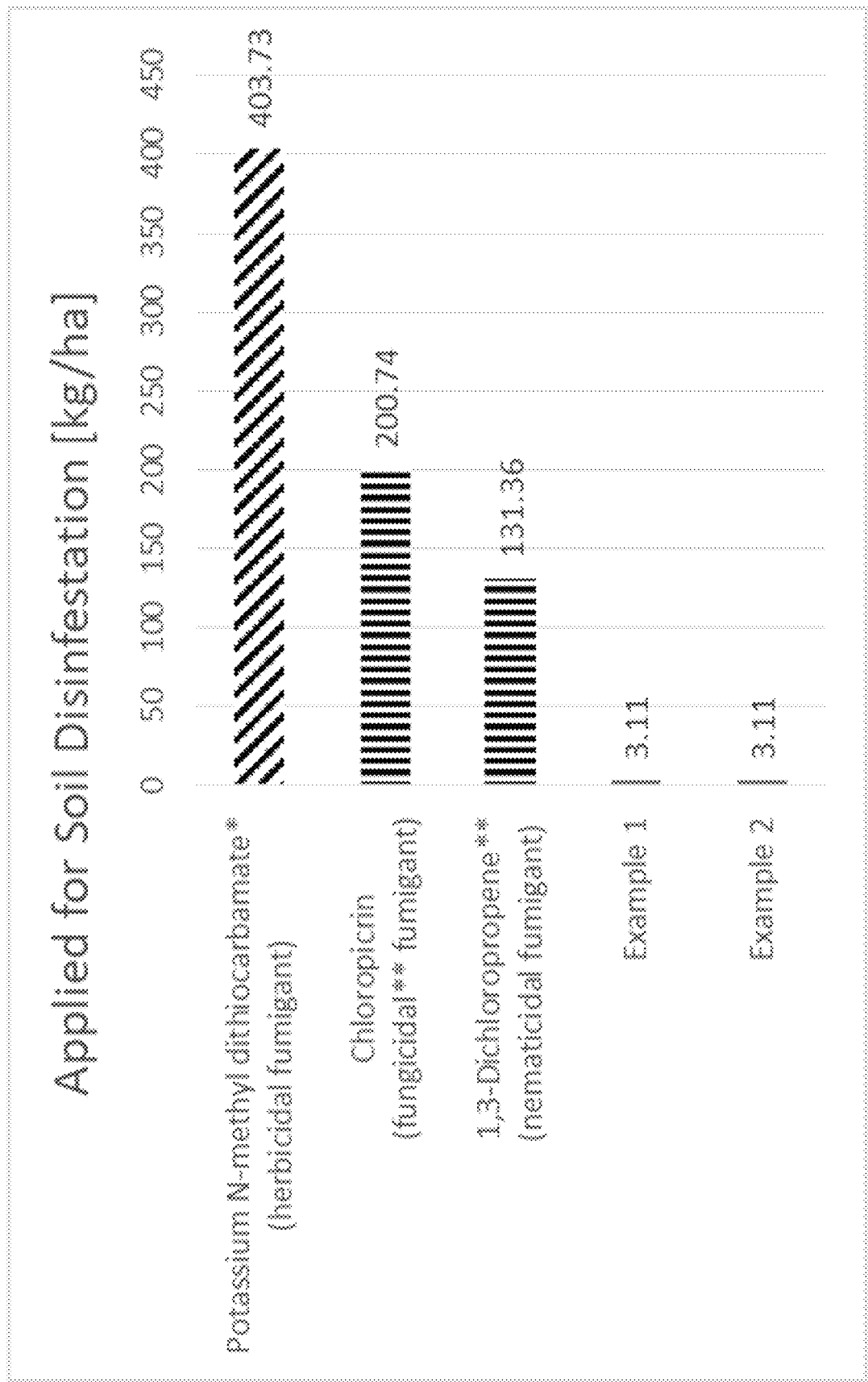
FIG. 5 shows a comparison of the required application rate for soil disinfestation in the field trial of fumigants and of the emitted pesticide amount from the fumigant-free soil disinfection materials
Figure 6A:
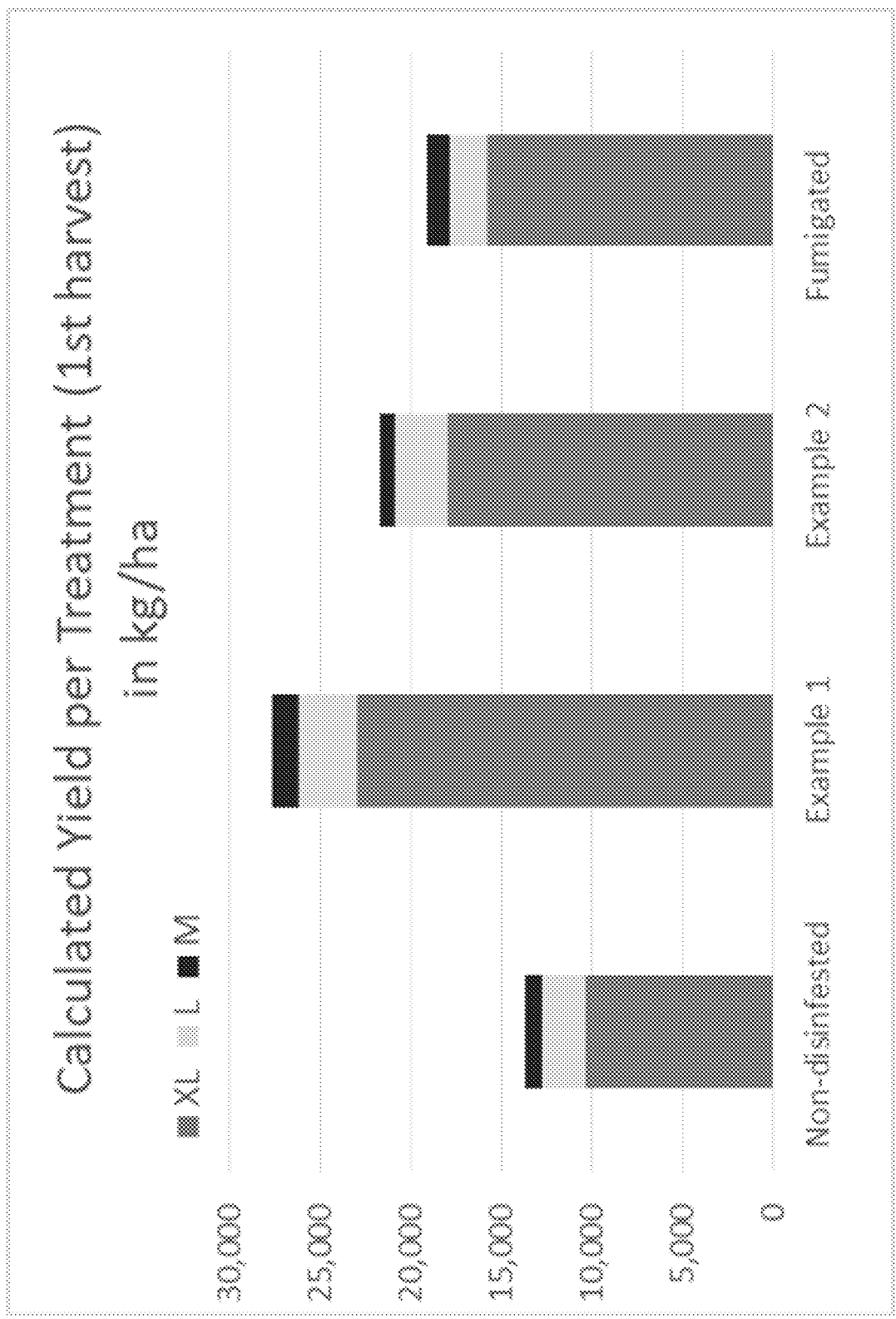
FIGS. 6A and 6B show that the pesticide-containing soil disinfestation material of the present technology produced higher, earlier and yields at first harvest and statistically same total yield of same USDA sizing (XL, L and M) and grading quality than the fumigant standard.
Figure 6B:
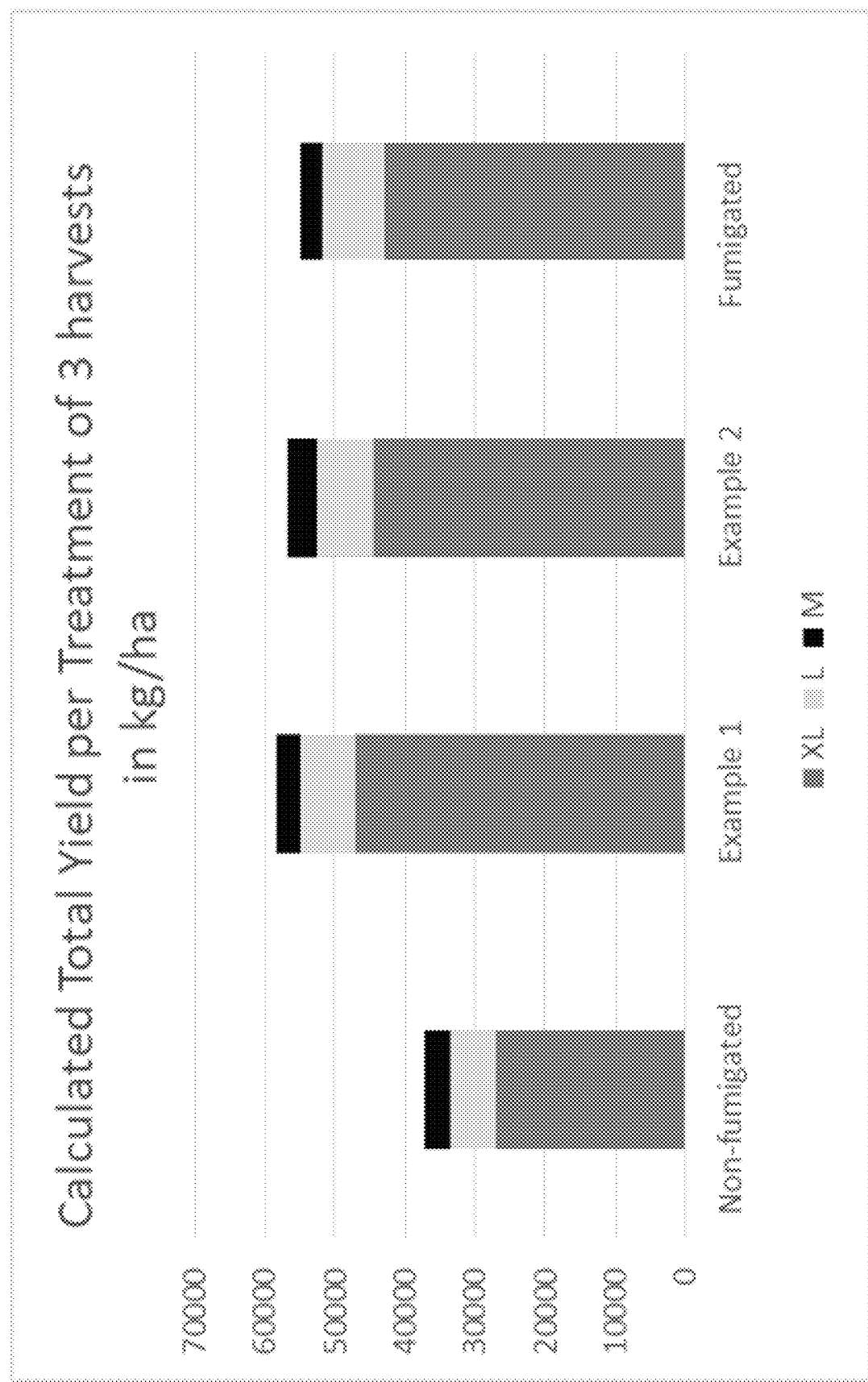

All references cited in this specification, and their references, are incorporated by reference herein in their entirety where appropriate for teachings of additional or alternative details, features, and/or technical background.

EQUIVALENTS

While the disclosure has been particularly shown and described with reference to particular embodiments, it will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following embodiments.

The invention claimed is:

1. A pesticide-containing soil disinfestation material comprising:
   i) a polymer composite material having a first face and a second face opposite to the first face;
   ii) a coating material coating a portion of the first face of the polymer composite material, the coating material comprising at least one water soluble polymer; and
   iii) at least two non-volatile pesticides incorporated in the coating material;
   wherein the coating material is not cross-linked, does not contain a hardener, and is configured to release the at least two non-volatile pesticides in an amount to provide a concentration of between about 1000 grams and about 5000 grams of pesticides per hectare of soil; and
   wherein lateral edges on the first face of the polymer composite material are uncoated, a width of the uncoated lateral edges being sufficient to allow handling of the pesticide-containing soil disinfestation material without exposure of an operator to the coating material.

2. The pesticide-containing soil disinfestation material of claim 1, wherein the coating material is configured to release the at least two non-volatile pesticides in an amount to provide a concentration of between about 1500 grams and about 5000 grams of pesticides per hectare of soil.

3. The pesticide-containing soil disinfestation material of claim 1, wherein the polymer composite material comprises one or more of non-biodegradable polyethylene or a biodegradable polyester.

4. The pesticide-containing soil disinfestation material of claim 3, wherein the polyethylene is selected from linear low density polyethylene, low density polyethylene and high density polyethylene.

5. The pesticide-containing soil disinfestation material of claim 4, wherein the polyethylene is a mixture of two or more of low density polyethylene, linear low density polyethylene and high density polyethylene.

6. The pesticide-containing soil disinfestation material of claim 3, wherein the biodegradable polyester is selected from polybutylene adipate terephthalate, polylactic acid polybutylene succinate, polybutylene succinate, a mixture of polybutylene adipate terephthalate with polylactic acid and a mixture of polybutylene adipate terephthalate with polybutylene succinate.

7. The pesticide-containing soil disinfestation material of claim 1, wherein the polymer composite material further comprises one or more of a UV stabilizer, UV absorber, and IR absorber.

8. The pesticide-containing soil disinfestation material of claim 1, wherein the polymer composite material is metalized.

9. The pesticide-containing soil disinfestation material of claim 1, wherein the coating material comprises at least one coating layer.

10. The pesticide-containing soil disinfestation material of claim 9, wherein the at least one coating layer is a pesticide reservoir coating layer.

11. The pesticide-containing soil disinfestation material of claim 1, wherein the coating material comprises at least two coating layers.

12. The pesticide-containing soil disinfestation material of claim 11, wherein a first coating layer is a pesticide reservoir coating layer and a second coating layer is a protective coating layer.

13. The pesticide-containing soil disinfestation material of claim 1, wherein the coating material comprises three coating layers.

14. The pesticide-containing soil disinfestation material of claim 13, wherein a first coating layer is a pesticide reservoir coating layer, a second coating layer is a protective coating layer and a third coating layer is a water equalizing coating layer.

15. The pesticide-containing soil disinfestation material of claim 1, wherein the coating material comprises gelatin.

16. The pesticide-containing soil disinfestation material of claim 1, wherein the coating material comprises gelatin and a water soluble polymer binder.

17. The pesticide-containing soil disinfestation material of claim 1, wherein the coating material does not comprise a superabsorbent polymer.

18. The pesticide-containing soil disinfestation material of claim 1, wherein the at least two non-volatile pesticides are selected from an herbicide, a fungicide, an insecticide and a nematicide.

19. The pesticide-containing soil disinfestation material of claim 1, wherein the polymer composite material has a thickness ranging between about 10 μm and about 250 μm, or between about 10 μm and about 150 μm, or between about 20 μm and about 120 μm, or between about 20 μm and about 50 μm, or between about 0.075 μm and about 150 μm or between about 150 μm and about 500 μm.

20. The pesticide-containing soil disinfestation material of claim 1, wherein the coating material has a thickness of less than about 12.5 μm, or less than about 6 μm, or less than about 3.0 μm, or less than about 1.5 μm, or less than about 0.75 μm.

21. The pesticide-containing soil disinfestation material of claim 1, wherein the polymer composite material is a film.

22. The pesticide-containing soil disinfestation material of claim 1, wherein the coating material comprises: i) a first coating layer comprising a gelatin and sodium polyacrylate; ii) a second coating layer comprising the at least two non-volatile pesticides incorporated in gelatin; and iii) a third coating layer comprising gelatin.

23. The pesticide-containing soil disinfestation material of claim 1, wherein subsequent to release of the at least two non-volatile pesticides from the pesticide-containing soil disinfestation material, the polymer composite material is substantially suitable for biodegradation, recycling and/or composting.

24. The pesticide-containing soil disinfestation material of claim 1, wherein said pesticide-containing soil disinfestation material comprises at least a herbicide and one of a fungicide with additional nematicidal activity or a nematicide with additional fungicidal activity.

25. A method of reducing the population of weeds, soil borne diseases and nematodes pests before planting by applying the pesticide-containing soil disinfestation material as defined claim 1 to the soil.

26. A method for achieving soil disinfestation, the method comprising mechanically applying the pesticide-containing soil disinfestation of claim 1 to the soil with a plastic mulch layer equipment.

* * * * *